July 10, 1962  J. W. LOWRY ET AL  3,043,678
RECLAMATION OF METALLIC VALUES FROM ALUMINOUS DROSS
Filed Aug. 12, 1959  11 Sheets-Sheet 4

INVENTORS
JOHN W. LOWRY
WARREN S. PETERSON
THOMAS W. F. FOSTER
BY James E. Tooney
ATTORNEY July 10, 1962 J. W. LOWRY ET AL 3,043,678
RECLAMATION OF METALLIC VALUES FROM ALUMINOUS DROSS
Filed Aug. 12, 1959 11 Sheets-Sheet 6

INVENTORS
JOHN W. LOWRY
WARREN S. PETERSON
THOMAS W. F. FOSTER
BY *James E. Tooney*
ATTORNEY United States Patent Office 3,043,678
Patented July 10, 1962

3,043,678
RECLAMATION OF METALLIC VALUES FROM ALUMINOUS DROSS
John W. Lowry, Pocatello, Idaho, Warren S. Peterson, Guilford, Conn., and Thomas W. F. Foster, Concord, Calif., assignors to Kaiser Aluminum & Chemical Corporation, Oakland, Calif., a corporation of Delaware
Filed Aug. 12, 1959, Ser. No. 833,668
12 Claims. (Cl. 75—24)

The invention relates to the recovering of the free metal entrained in the dross or skimmings obtained from melts of aluminum and aluminum base alloys.

This application is a continuation-in-part of our co-pending application Serial No. 637,206, filed January 30, 1957, now abandoned.

In the course of aluminum melting operations, such as the remelting and refining of aluminum pigs, oxides, nitrides and other non-metallic impurities accumulate on the surface of the molten metal. Prior to tapping of the molten metal, these non-metallics are removed or skimmed from the surface of the melt. Substantial quantities of aluminum metal will be unavoidably entrained with the non-metallics and also be removed with the non-metallics. This mixture of non-metallics and free aluminum is termed aluminous dross or skim. For convenience, this mixture of non-metallics and free aluminum will be hereinafter, in the specification and the appended claims, referred to as dross.

As stated above, the dross derived from aluminous metal melts unavoidably contains a substantial proportion of free metal as a result of the usual stirring of the melt and raking off of the floating material. During the raking, skimming and removal of the dross from the top of the metal melt, the dross becomes compressed into pasty mud-like masses. These masses of dross when removed from the furnace will vary from small lumps the size of a walnut to large lumps the size of a watermelon. The amount of free metal in the dross may vary from 30 to 95% of the total weight of dross depending upon a number of factors, such as the composition of the alloy being melted, the melting procedure followed and the care with which the dross is skimmed or raked from the melt. If a batch of hot dross removed from a melt is allowed to stand, some free metal will accumulate at the bottom of the mass, but the larger part of the free metal will remain intimately mixed with non-metallics in the form of globules or small particles and will not readily separate from the non-metallic portion. Also, upon being exposed to the atmosphere, the hot dross may begin to react with the air, if the reaction has not already started in the furnace; and if the reaction is not stopped, a large part of the available metal will be lost. The separation of the free metal from the non-metallic portion of the dross has been a difficult problem. Several methods used or proposed for effecting separation are mentioned below.

In one method, the dross is cooled to room temperature as quickly as possible, crushed as in a ball mill, and then screened. By this mechanical means of separation, the coarser metal particles can be separated and recovered, however, the bulk of the free metal in the dross is in the form of very fine particles which makes recovery by mechanical means unattractive. In another process the hot dross is stirred into a heel of molten aluminum or aluminum alloy. This process is not efficient because in agitating the dross with the molten metal heel, nearly as much metal is beaten into the dross as is removed. In another process a fused salt bath has been proposed as a substitute for a molten metal heel. In general, common salt, i.e. sodium chloride, is employed in this process due to the low cost of the material. However, while the cost of such material is low, the recovery of molten metal involved has also been very low. These low recoveries are due to the fact that common salt fails to attack the oxide coatings on the small droplets of aluminum material entrapped in the aluminous dross. The use of common salt has a further disadvantage that substantial heat is required to melt the salt since it melts at a temperature of approximately 800 degrees C. (approximately 1480 degrees F.). If satisfactory melting is to be made possible, the salt bath must be heated at a temperature substantially above its melting point in order to have sufficient fluidity, and it must be kept at this temperature during the introduction of the aluminous dross and during melting down. For example, where the salt melts at 1480 degrees F., the bath would have to be heated to a temperature of at least about 80 degrees F. higher or about 1560 degrees F. in this instance. For melting and treating aluminum, the maximum temperature permissible for best results is 1500 degrees F. Above this temperature considerable overheating is attained which results in corresponding deterioration of quality of the metal and in undesirable fumes. When the aluminous dross-salt flux mixture is heated to 1560 degrees F., it possesses a considerable dissolving power for all metals which come into consideration as impurities. In addition, the hot common salt melt strongly attacks furnace lining.

According to a more recent process, hot dross, which may be either the dross as removed from the melting furnace or cold dross which has been reheated, is placed in an inclined rotatable drum open to the air, and the dross is rotated therein for a short period of time. If the dross is not already burning when introduced into the drum, the ignition is started by the addition of suitable salts. In this process, a portion of the finely divided free metal is consumed in reacting with the air to provide the heat essential for raising the temperature of the mass, and consequently the recovery of metal is not as high as is desired. Metal recoveries on the order of 65 to 70% of the available metal have been achieved by this method, but on the average the recovery has been found to be below 60%. In addition, it is difficult to control the furnace temperature when employing this process, and generally the temperature is well above 1500 degrees F. with the attendant disadvantages thereof.

In order to curb or limit the amount of aluminum metal lost in the exothermic reaction between molten aluminum and oxygen, it has been proposed that a non-oxidizing atmosphere containing aluminum chloride as the essential component be provided in the drum during the rotation of the dross. Allegedly, higher recoveries of the total available metal are realized when the aluminum chloride atmosphere is used. Recoveries as high as 90% of the total available metal have been reported, however, this is only obtained upon repeated treatments of the dross. An average recovery of only about 70% of the total available metal has been obtained in treating large numbers of dross charges.

In accordance with the instant invention, the aluminous dross is placed inside a rotary furnace. Next, a predetermined amount of salt flux in solid form, preferably granular, comprising a mixture of sodium chloride, potassium chloride and a fluoride-containing compound or constituent is placed in the rotary furnace on top of the dross. The furnace is then rotated at a suitable rate of speed to obtain a violent tumbling or cascading action of the mixture of dross and solid salt flux in order to break up large lumps of dross. Heat is applied, such as by a suitable burner, to the mixture of dross and salt flux in order to liquefy the flux. The application of the external heat may be started at any time during the rotation to give the tumbling or cascading action, however, it is preferred to start the application of heat at the beginning of the tumbling action, that is, the burner is positioned in the rotary furnace after the charging of the flux. After the flux is liquid, the mixture is subjected to a gentle rolling action to allow maximum opportunity for separation of droplets of metal from the dross and to allow the droplets of metal to agglomerate in a pool of metal. The liquid flux, which is intimately mixed with the dross particles, selectively wets the oxides, nitrides and non-metallic impurities, thereby promoting the separation of the metal from the dross. After rotating the furnace and heating the material for a suitable period of time, the molten metal is drained from the furnace followed by dumping of the dross and flux residue. It has been found that the amount of salt flux required is in a ratio of salt flux to non-metallics in the aluminous dross ranging from 1:1 to 3:1 by weight. The ratio of weight of dross to weight of salt flux may vary from 1:1 to 3:1, with about 2:1 being preferred.

In practicing the process of this invention a substantial amount of intimate tumbling of the salt flux and aluminous dross is necessary. Violent tumbling or cascading of the mixture while the salt flux is solid is necessary to break up large lumps of dross. Without substantial tumbling after the salt flux becomes molten there is inadequate contact between the salt flux and the aluminous dross, and insufficient agglomeration of the particles of molten metal entrapped in the aluminous dross is obtained. Accordingly, by treating the material in a rotary barrel furnace and rotating said furnace at a suitable rate of speed, that is at a speed at which a cascading action of the mixture of dross and solid flux is obtained, large lumps of dross are initially broken up, and then the dross and salt flux upon becoming molten are intimately mixed. The speed of the rotary furnace should be below the speed at which the material in the furnace will centrifuge, that is, the material will be carried through a complete circle. For purposes of illustration, a furnace having an internal diameter of four feet and rotated at a speed of twenty revolutions per minute would give the violent tumbling and cascading action necessary for breaking up the large lumps of dross. The use of a rotary furnace has a further advantage over a stationary furnace in that excessive heating of the refractory lining of the furnace is prevented or substantially reduced due to the molten metal, salt, etc., washing the walls of the furnace.

As previously mentioned, the temperature of the aluminous dross-salt flux mixture should not be allowed to exceed 1500 degrees F., and lower temperatures are preferred. At higher temperatures it is exceedingly difficult to separate the molten metal from the aluminous dross and flux. In addition, undesirable fumes are produced and the furnace lining is attacked. However, as previously mentioned, the furnace temperature must be substantially above the melting point of the flux and of the aluminum metal in order to have sufficient fluidity. A high degree of fluidity of the flux is necessary in order to achieve good contact between the flux material and the aluminous dross material. In addition, the fluid flux covers the aluminous dross material and prevents losses of the aluminum metal due to oxidation and burning.

In order to be able to employ temperatures in the furnce lower than 1500 degrees F., a relatively low melting salt flux is essential. By employing a mixture of sodium chloride and potassium chloride, a melting point lower than that of sodium chloride alone is obtained. A eutectic mixture comprising 44% by weight of sodium chloride and 56% by weight of potassium chloride has a melting point of about 1225 degrees F. Where a flux composition comprising this eutectic mixture is employed in a furnace, a temperature as low as 1350 degrees F. is possible. Thus, in this instance, the temperature of the aluminous dross-salt flux mixture may range from 1350 degrees F. to 1500 degrees F. However, the preferred temperature range is from 1400 to 1450 degrees F.

Mixtures of sodium chloride and potassium chloride provide the desired low melting point for treatment of aluminous dross, however, mixtures containing these constituents alone do not affect the protective oxide coatings on the small droplets of metal which are generally contained in the aluminous dross. By including a small but effective amount of a fluoride constituent in the salt flux of this invention, a flux is produced which strips the oxide coating from the small droplets whereby the molten metal represented thereby is recovered. One of the best fluoride constituents which can be employed for this purpose is cryolite, and it has been found that a very small amount of cryolite, for example, 2.5 to 5% based on the total weight of flux, is effective. Accordingly, the flux preferred for use with the instant invention consists essentially of sodium chloride, potassium chloride and a small but effective amount of a fluoride constituent. While cryolite has been referred to specifically, other fluoride constituents such as aluminum fluoride and sodium fluoride may be employed. Although a large quantity of the fluoride constituent may be employed, such fluoride constituents are generally expensive and accordingly, the lowest amount of fluoride which would serve the purpose of attacking the oxide coatings on the small droplets of metal is preferred.

The expression "consists essentially," as used herein in the specification and the claims, means that the flux composition referred to above does not contain other substances in amounts to materially affect the desirable characteristics of the flux, although other substances may be present in minor amounts which do not materially affect such desirable characteristics.

While the optimum flux composition would involve, in addition to the fluoride constituent, use of the eutectic mixture of sodium chloride and potassium chloride melting at 1225 degrees F., satisfactory results may be obtained with a mixture having a melting point as high as 1300 degrees F. Melting points of 1300 degrees F. or less may be achieved with a sodium chloride-potassium chloride mixture comprising from 15% to 65% by weight sodium chloride and from 35% to 85% by weight of potassium chloride, the sum of the percentages of sodium chloride being equal to 100 in all cases. While it is preferred to maintain the melting point below 1300 degrees F., a mixture melting at a temperature no higher than 1380 degrees F. may be satisfactory for obtaining fundamental improvements in the metal obtained. Such higher melting point materials are useful only where the higher melting point results from the use of more than 65% sodium chloride. This is due to the fact that in many cases the poorer quality of the metal and the poorer recovery obtained with such higher melting point material is offset by the fact that sodium chloride is substantially less expensive than potassium chloride. Thus, mixtures of sodium chloride and potassium chloride comprising 15 to 75% sodium chloride and 25% to 85% potassium chloride may be employed.

In order to control the temperature in a furnace within either of the ranges above specified, it has been found most satisfactory to heat the material by means of a suitable burner such as an oil or gas burner, which directs the flame into the furnace. This applies the heat directly to the salt and aluminous dross mixture and thus permits accurate control of the temperature. In addition, no aluminum metal is consumed in order to provide the heat necessary for the process.

By way of example, approximately 428,000 pounds of dross from aluminum melting furnaces were processed in an oil fired cylindrical furnace which is rotatable about its horizontal axis. The furnace had an internal diameter of four feet and a length of eight feet four inches, and it was capable of processing 9 cubic feet of dross per batch. To treat this quantity of dross, 212,000 pounds of granular salt flux were employed. This flux consisted of about 45% sodium chloride, 50% potassium chloride and 5% cryolite. For each batch, hot dross from a remelt furnace was first dumped into the heated rotary barrel furnace, while the furnace rotated at a slow rate of speed. The dross varied in size from small lumps the size of a walnut to large lumps the size of a watermelon. After the dross was charged into the furnace, the rate of rotation was increased to twenty revolutions per minute and the salt flux was added. Initially a violent tumbling or cascading action mixed the dross and flux in order to break up the large lumps of dross. Immediately after charging, the burner was positioned in the barrel opening and the charge was heated from 5 to 15 minutes. During heating of the contents, rotation was continued at twenty revolutions per minute. As the flux progressively melted, the violent tumbling or cascading action gradually quieted down to a smooth gentle rolling action. This change of action was obtained without changing rotation speed. After processing was complete, rotation was stopped and the burner was turned off. The molten metal was then allowed to run out into pig molds through a suitable tap hole in the bottom of the furnace. After considerable experimental work, it was found that it was possible to remove the metal from beneath the floating residue and that the difference in viscosity between metal and the flux-dross residue would allow the metal to drain form the furnace without allowing any appreciable quantity of such residue to drain from the open tap hole. The metal was allowed to drain until the last few drops came out. It was found that the tap hole will normally block itself with dross when the metal flow stops, and it is not necessary to doughball the furnace prior to dumping. The residue that is in the furnace was then dumped from the rotary furnace as a semi-liquid by tilting about a transverse axis. The dumping was done as rapidly as possible so that the liquid portion of the residue will carry any hard chunks of dross or pieces of brick that may be contained therein out of the furnace. When properly processed and dumped, further cleaning of the barrel is not necessary. The furnace was then returned to its original position for processing a new batch. Approximately 275,000 pounds of aluminum pig was obtained. The total available metal in the dross was about 292,000 pounds which represents a recovery of about 94%. This is substantially better than the recoveries obtained according to prior art. One of the best of the prior art processes is that wherein a portion of the finely divided metal in the dross is burned to provide the necessary heat. As previously mentioned, the best recoveries obtained by this latter process range from 65 to 70% with the average less than 60%.

As a further example, 1,115,175 pounds of dross from aluminum melting furnaces were processed in the rotating furnace of the preceding example. Also, the composition of salt flux and the operating condition and procedures were the same as those in the preceding example. The amount of granular salt flux used in the instant processing was 563,440 pounds. The total metal in the 1,115,175 pounds of dross was 682,145 pounds. The processing of the dross yielded 638,930 pounds of aluminum metal which represents a recovery of about 93.5%.

A suitable apparatus for carrying out the above process requires a rotary barrel furnace, means for rotating the furnace about its axis during the processing, means for tilting the furnace about a transverse axis in order to dump the residue from the furnace and possibly to tap the molten metal from the furnace. In addition a suitable burner means is required which may be moved into position over the opening in one end of the furnace during processing and which may be moved out of position when it is desired to change the furnace. Also suitable charging means and fume removal means such as ductwork should be provided.

In the accompanying drawings are illustrated several forms of apparatus in which this invention may be carried out.

In the drawings:
FIGURE 5 is a side elevational view of the rotary barrel furnace of FIGURES 1 and 2 with the tilting means of FIGURES 3 and 4 connected thereto.
FIGURE 6 is a side view of one means for charging the rotary barrel furnace of FIGURES 1 and 2.
FIGURE 12 is a plan view of the apparatus of FIGURE 11 and including a rotary table for mounting molds into which the molten metal from the rotary furnace may be cast.
FIGURE 15 is a detail view of a burner employed for heating the charge in the rotary furnace of FIGURE 11.

Figure 1:
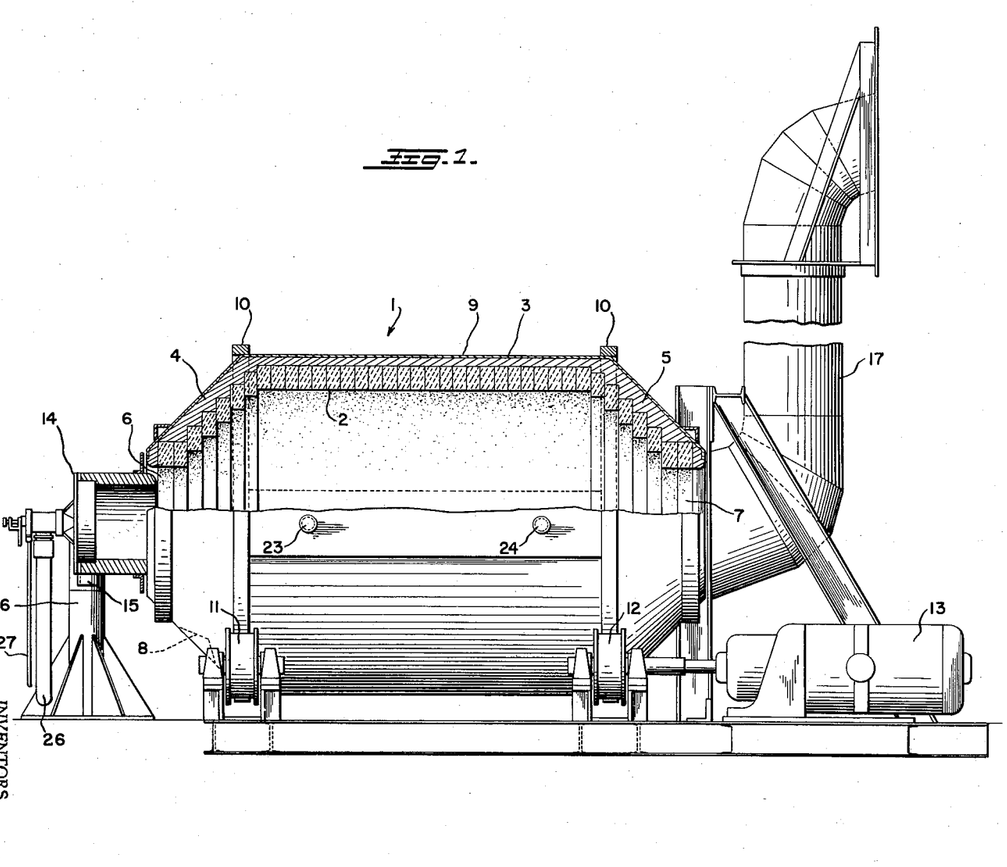
FIGURE 1 is a side elevational view partly in cross section with parts removed for purposes of clarity, of a rotary barrel furnace of this invention and one means for rotating and heating such furnace.
Figure 2:
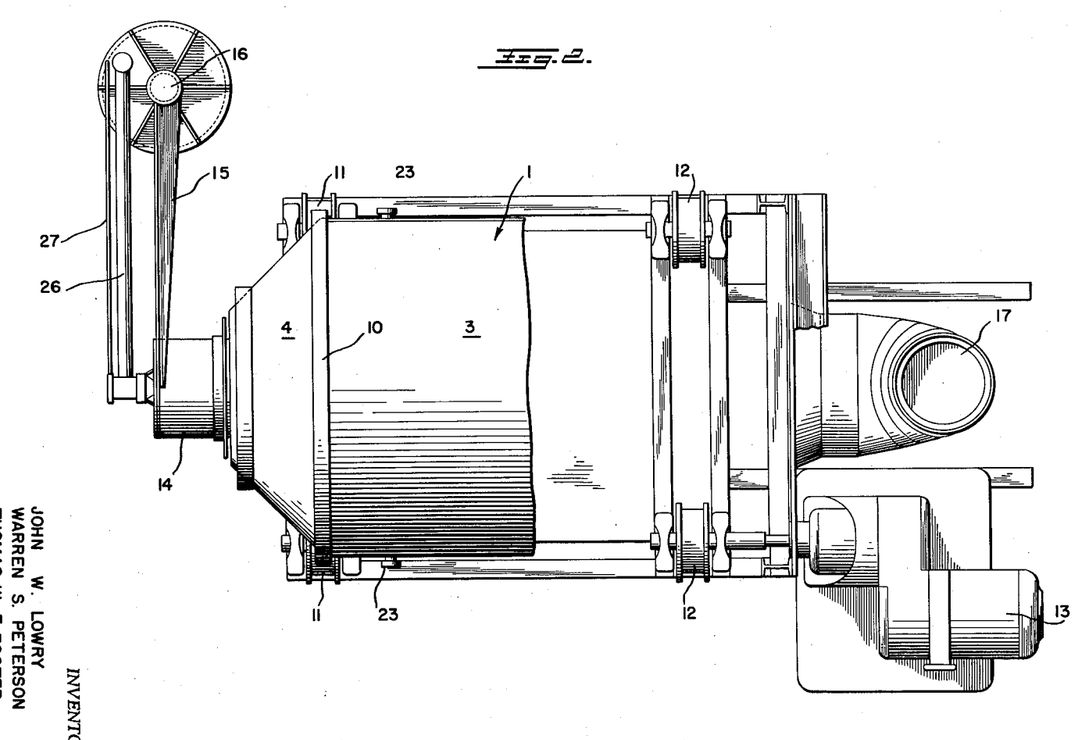
FIGURE 2 is a plan view of the furnace of FIGURE 1.

With reference to FIGURES 1-10, one form of apparatus for carrying out this invention is described. With reference more particularly to FIGURE 1, it will be seen that this apparatus comprises a rotary furnace 1 having a shell 3 and a suitable refractory lining 2. The central portion 9 of furnace 1 is cylindrical while ends 4 and 5 are shaped like the frustum of a cone and have suitable openings 6 and 7 at the narrow portions thereof. At one end 4 of furnace 1 a suitable tap hole 8 is provided. About the periphery of each end of the cylindrical portion 9 of furnace 1 are suitable metal tires 10 affixed thereto. When rotary furnace 1 is in posiiton for carrying out the reaction, it is supported by a set of rollers 11 near one end 4 and a second set of rollers 12 near end 5, said sets of rollers 11 and 12 being in contact with tires 10 thereby supporting furnace 1. One of the rollers 12 is driven by suitable means such as a motor 13. At the left end 4 of furnace 1, a suitable oil burner 14 is adapted to fit within opening 6. Oil burner 14 is suitably mounted at one extremity of a frame 15, which frame 15 in turn is pivotally mounted at its other extremity on a suitable vertical supporting member 16 which in turn is mounted on the floor. By such pivotal mounting, it is possible to swing oil burner 14 in a clockwise direction, when viewed from above, away from opening 6 of rotary furnace 1 to permit charging and dumping of the furnace. Oil burner 14 may be supplied with air through a suitable conduit 26, and with oil through a suitable oil line 27.

while an oil burner is illustrated in the drawings, a gas burner could be employed in lieu thereof.

At the end 5 of rotary furnace 1 opposite the burner, a suitable duct 17 is aligned with opening 7 to conduct combustion gases away from furnace 1.

Figure 3:
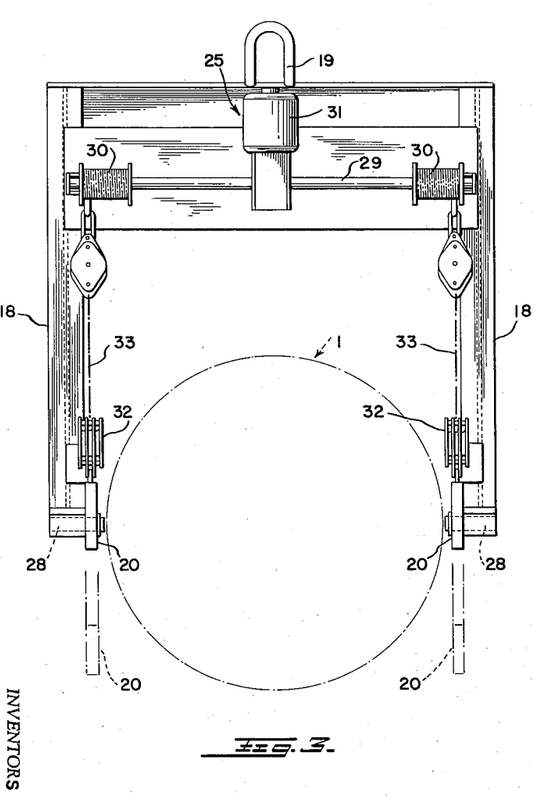
FIGURE 3 is a side elevational view of one means for tilting and dumping the rotary barrel furnace of FIGURES 1 and 2.
Figure 4:
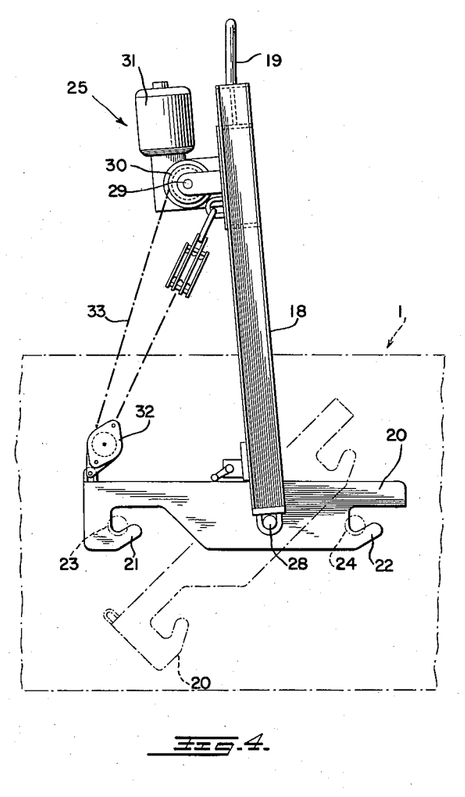
FIGURE 4 is an end elevational view of the tilting and dumping means of FIGURE 3.

In order to remove the molten metal from the furnace after processing is complete, it is necessary to tilt said furnace. Prior to said tilting operation, the furnace should be rotated to a position whereby tap hole 8 is at the bottom of the furnace. A suitable apparatus for lifting the furnace and tilting same is illustrated in FIGURES 3 and 4 and comprises a U-shape frame 18 which may be lifted by a crane (not shown) through eye 19. At the extremities of U-shape frame 18, suitable double hook members 20 are pivotally mounted. Each double hook member 20 has hooks 21 and 22 formed at each end thereof. These hooks are adapted to engage projections 23 and 24 on each side of rotary furnace 1. By engaging the hook of a crane through eye 19, rotary furnace 1 may be lifted off of rollers 11 and 12. Due to the position of the point 28 at which double hooks 20 are pivotally mounted on U-shape frame 18 relative to the center of gravity of rotary furnace 1, gravity tends to pivot the furnace in a counter clockwise direction of FIGURE 1, that is to say in the direction of tap hole 8. This, however, is prevented by use of a block and tackle type electric hoist 25. Hoist 25 comprises a winch 29 having reeling spools 30 at either end thereof. Winch 29 is driven by suitable electric motor means 31. The hooks 21 of each double hook member 20 is attached to a block and tackle 32. The free ends of the rope 33 of each block and tackle 32 is suitably wound about its respective spool 30. By adjusting each block and tackle 32 through electric motor 31, it is possible to adjust the angle at which the furnace is held when lifted by the crane through U-shape frame 18. This angle is first adjusted to a position whereby the lowest point on the inside of the furnace is at the entrance to tap hole 8. Tap hole 8 is then unplugged to allow molten metal to pass through and into suitable containers such as pig molds. The furnace is then raised up and rotated toward the vertical position over suitable containers thereby dumping the residue through opening 6 into such containers. After dumping the residue each block and tackle 32 is taken up to place furnace 1 in a horizontal position, after which the furnace is lowered onto rollers 11 and 12. The furnace is then ready for charging and for processing another batch.

Figure 7:
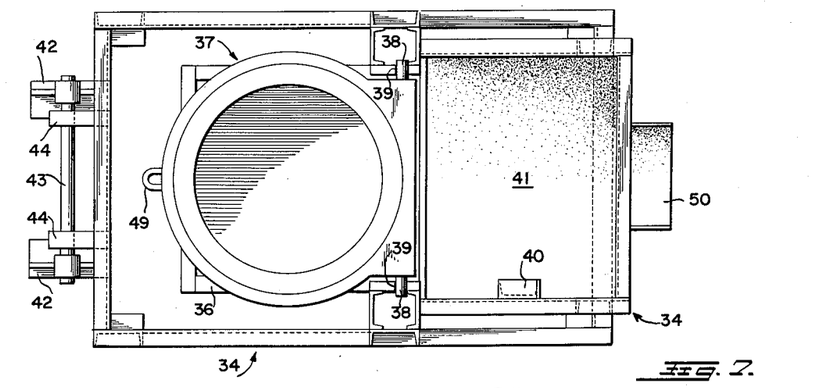
FIGURE 7 is a plan view of the charging means of FIGURE 6.

One means for charging furnace 1 is best illustrated in FIGURES 6 and 7. This means comprises a suitable framework 34 mounted on suitable rolling means such as wheels 35. A suitable platform 36 is provided on one portion of framework 34 to support charge container 37 in the upright position. The container 37 is provided with suitable trunnions 38 in the upper end and to one side thereof. A suitable hook or slot 39 is provided within which trunnions 38 are adapted to fit. Container 37 may be dumped by lifting the lower portion furthest removed from trunnions 38 by suitable means such as a crane hooked to eye 49 to position 2 shown in phantom pivoting about trunnions 38. Container 37 is supported in position 2 by a suitable structural stop member 40. Immediately beneath container 37 when supported in position 2 is provided a suitable trough 41 fastened to framework 34 and having a lower extending portion 50 which may extend into opening 6 in rotary barrel 1 for charging. When charging is complete, framework 34 may be moved out of position by rolling on wheels 35 whereby burner 14 may be swung into position for heating. In order to maintain framework 34 in position for charging, vertical members 42 are provided and positioned such that a pipe 43 may be passed through openings in the upper portion of vertical members 42 and through openings in an extended portion 44 of framework 34 to maintain said framework in position for charging.

Figure 8:
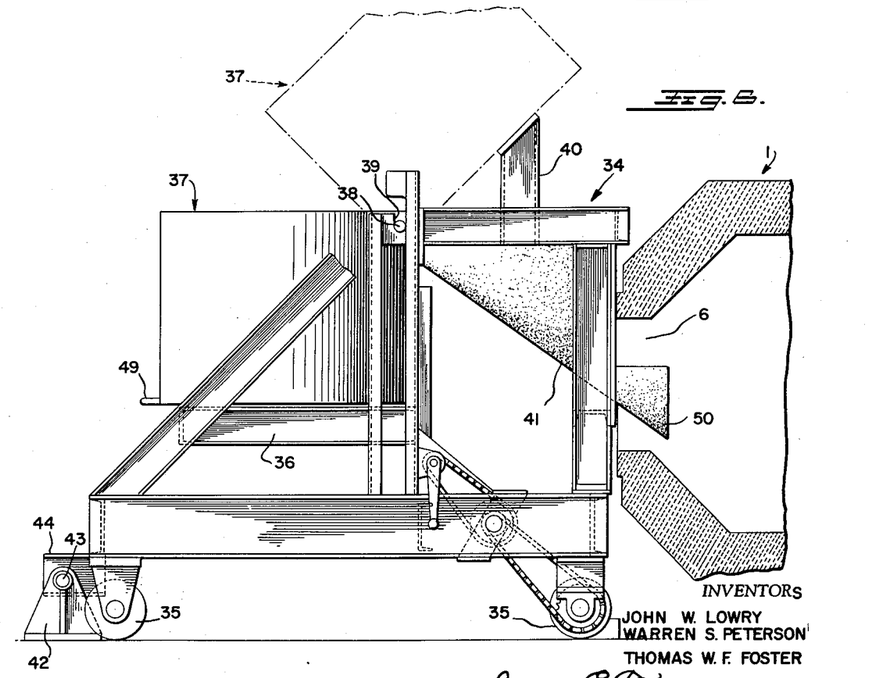
FIGURE 8 illustrates a movable charging trough for use in connection with a second form of charging means for charging the rotary barrel furnace of FIGURES 1 and 2.
Figure 9:
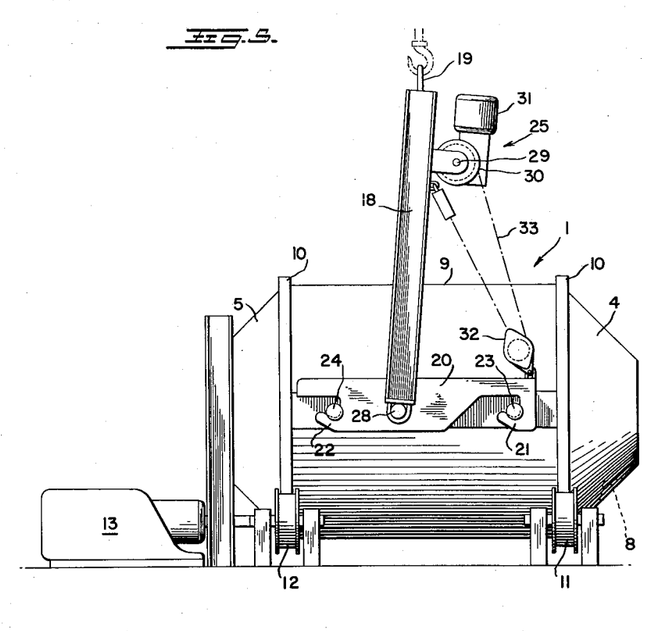
FIGURE 9 is a plan view of the movable charging trough of FIGURE 8.

Another means for charging furnace 1 is best illustrated in FIGURES 8 and 9. This means includes a suitable trough 45 mounted on a suitable framework 46 which in turn is mounted on wheels 47. Wheels 47 may be adapted to run on tracks 48 and 48' in order to guide the trough 45 and framework 46 into and out of charging position.

Figure 10:
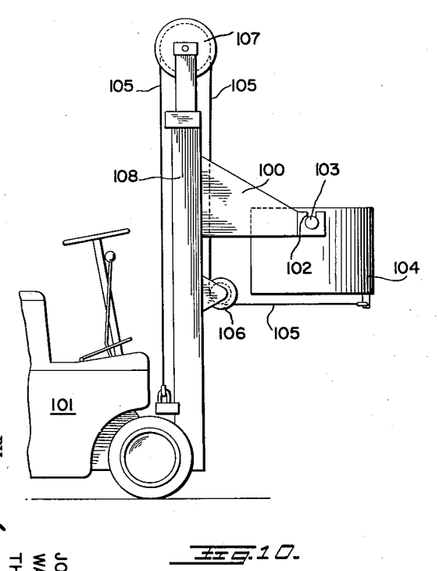
FIGURE 10 is a side elevational view of a fork lift truck type charging means for use in connection with the trough of FIGURES 8 and 9 for charging the rotary barrel furnace of FIGURES 1 and 2.

A means of charging material to the furnace comprises adapting a portable hydraulic lifting means, such as a conventional fork lift truck, for pivotally mounting a container for the charging material. This is best illustrated in FIGURE 10, and comprises a pair of specially designed arms 100 affixed to the carriage of a conventional fork lift truck 101. Arms 100 are provided with slots or grooves 102 into which trunnions 103 of containers 104 are adapted to fit. Thus containers 104 may be pivotally mounted on arms 100 which may be raised or lowered by the carriage of fork lift truck 101. In order to tilt or unload container 104, a cable 105 may be affixed to the lower front portion of container 104, passed horizontally around pulley 106, then vertically and around pulley 107 at the top of fork lift truck mast 108 and then downwardly. By pulling on cable 105, the container 104 may be completely inverted whereby when fork lift truck 101 is properly positioned the material may be dumped from container 104 into trough 45 and thus into rotary furnace 1.

With reference more particularly to FIGURES 11–15 inclusive, of the drawings, another form of apparatus which may be employed with this invention is illustrated. This apparatus comprises a suitable refractory lined rotary barrel 51, substantially the same as rotary barrel 1 of FIGURE 1, supported on a sub-frame 52 by means of suitably mounted rollers 53 and metal tires 54 and 54'. One of the rollers 53 is suitably driven by a motor 94 through a gear reducer 95. Sub-frame 52 is in turn pivotally mounted at one end on a suitable upstanding framework 55 by means of bearings 56. The remainder of sub-frame 52 is supported by a pair of gear segments 57, the teeth of which engage pinions 58. Pinions 58 are mounted on shafts 59 of gear reducers 60 which in turn are suitably mounted on framework 55. The end of sub-frame 52 may be moved upwardly and downwardly describing an arc having bearings 56 as a center point by rotation of pinions 58 and shafts 59 through the use of suitable motors 61 driving gear reducers 60 by means of motors 61 through suitable coupling means 97. The end 69 of barrel 51 furthest removed from bearings 56 may be raised by rotating pinions 58 to a point where the barrel is practically vertical in which position treated dross and flux may be dumped through a large circular opening in end 71 of barrel 51. By rotating pinions 58 in the direction opposite that for dumping the end 69 of barrel 51 may be lowered to a point where the molten metal may be tapped or drained out through tap hole 62 when the rotary barrel 51 is positioned with tap hole 62 at the bottom. While a motor driven pinion and gear segment means has been shown and described for tilting rotary barrel 51 alternatively, a hydraulic cylinder and piston assembly could be employed for this purpose.

Figure 11:
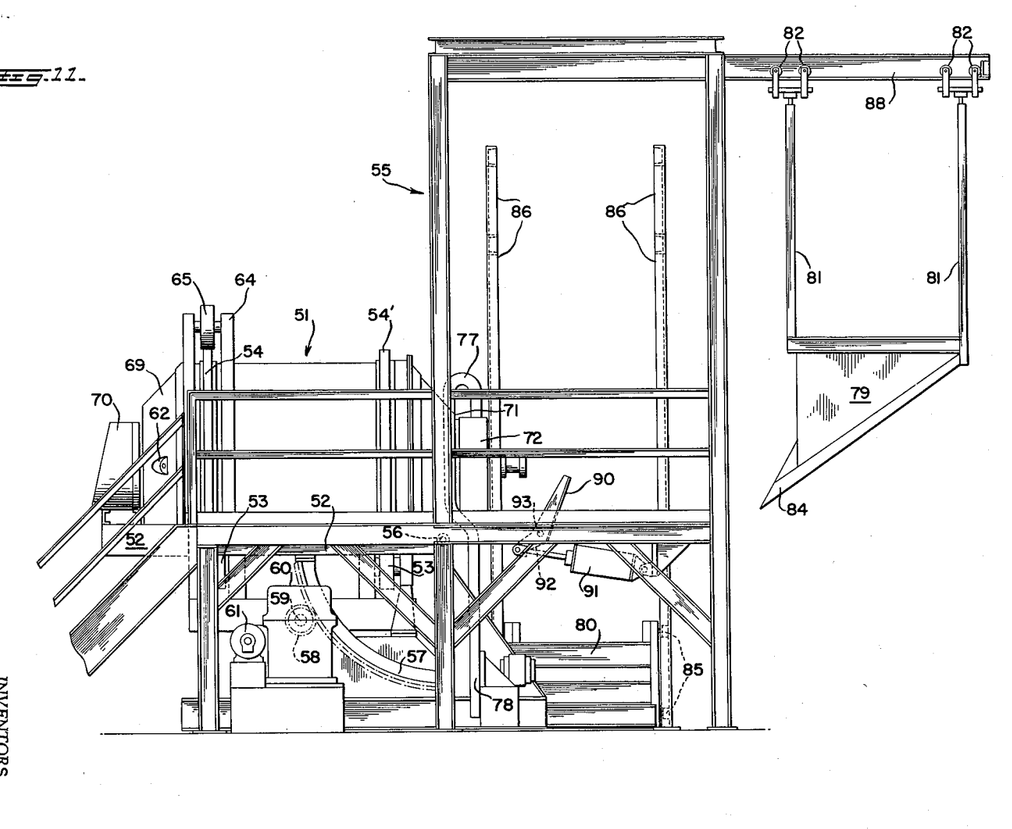
FIGURE 11 is a side elevational view, with parts removed for purposes of clarity, of a rotary barrel furnace employing a rotary barrel substantially the same as FIGURES 1 and 2 but illustrating alternative apparatus for charging and unloading the rotary barrel.
Figure 13:
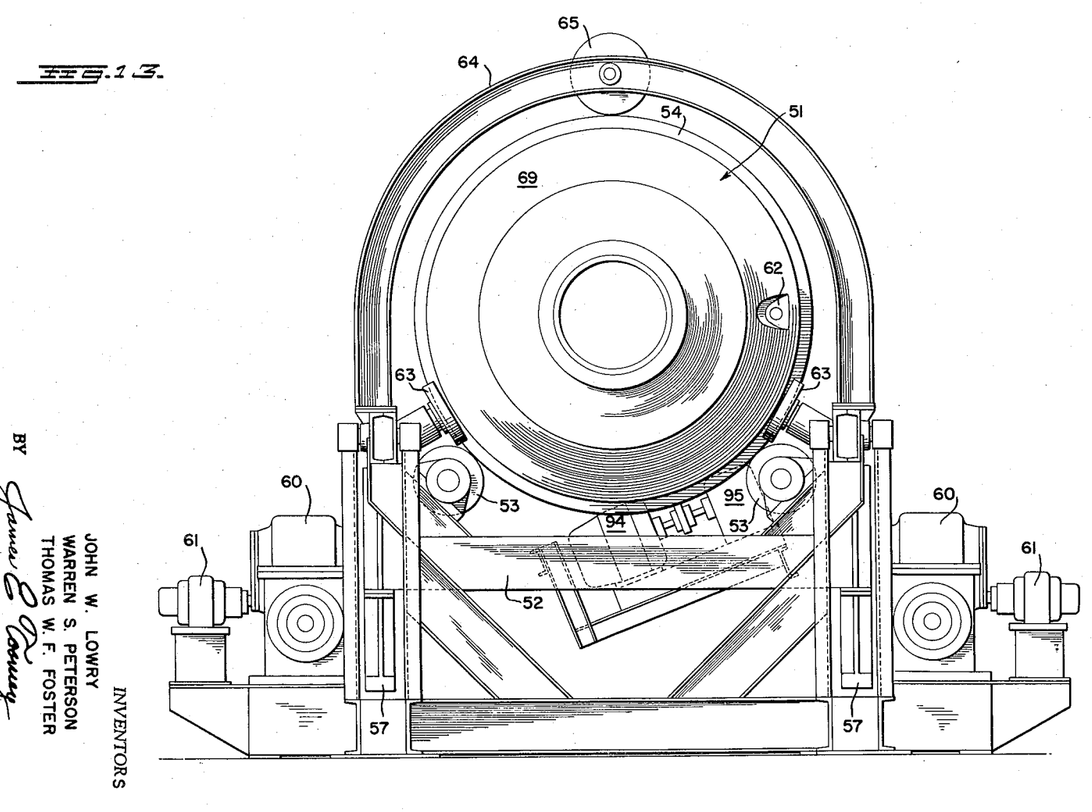
FIGURE 13 is an end elevational view of the rotary barrel furnace of FIGURE 11 with parts removed for purposes of clarity.

In order to maintain barrel 51 in position on sub-frame 52 when tilted, two pairs of side rollers 63 are positioned in contact with either side of one metal tire 54. In addition an arcuate frame 64 is positioned around tire 54. Frame 64 supports a roller 65 in contact with tire 54.

With reference more particularly to FIGURE 12, a rotatable table 66 adapted to hold four suitable pig molds 67 can be seen. The location of rotatable table 66 is such that each pig mold mounted thereon may in turn be positioned immediately below a short pouring trough 68 positioned below tap hole 62. Thus, molten metal issuing from tap hole 62 may flow into each of the four pig molds 67 in turn. The tap hole end 69 of barrel 51 is also provided with a suitable large round opening which will permit removal of combustion gases. A short section of duct 70 is mounted on sub-frame 52 in alignment with this opening in end 98. Short duct 70 matches an additional long duct (not shown) which conducts the gases through a suitable induced draft blower from which it is exhausted to the atmosphere.

At the opposite end 71 of barrel 51 the large round opening provided therein serves the triple purpose of providing an opening for charging the furnace, dumping the slag and for heating the charge by use of a suitable burner 72. With reference to FIGURE 15, it will be seen that burner 72 is mounted on a suitable gate means 73 comprising two hinged portions 74 and 75. Thus burner 72 may be moved into position for heating the barrel or may be moved out of position when it is desired to dump the barrel. Burner 72 is supplied by a suitable oil line 76 and air is provided through a conduit 77 from a blower 78. While an oil burner has been shown and described, a gas burner could be employed for this purpose.

In order to charge barrel 51, a movable hopper 79 and skip hoist 80 are provided. Hopper 79 is supported by suitable vertical members 81 which in turn are supported by means of rollers 82 in contact with the upper surface of the lower flange on either side of an I-beam 83. Thus hopper 79 may be maintained in the position shown in FIGURES 11 and 12 out of the way of operations except when it is desired to charge the furnace. In such case the hopper may be moved into position by rolling along I-beam 83 until the hopper is in position in front of end 71 of barrel 51 with the lower pointed portion 84 inside the large circuit opening of barrel 51.

Figure 14:
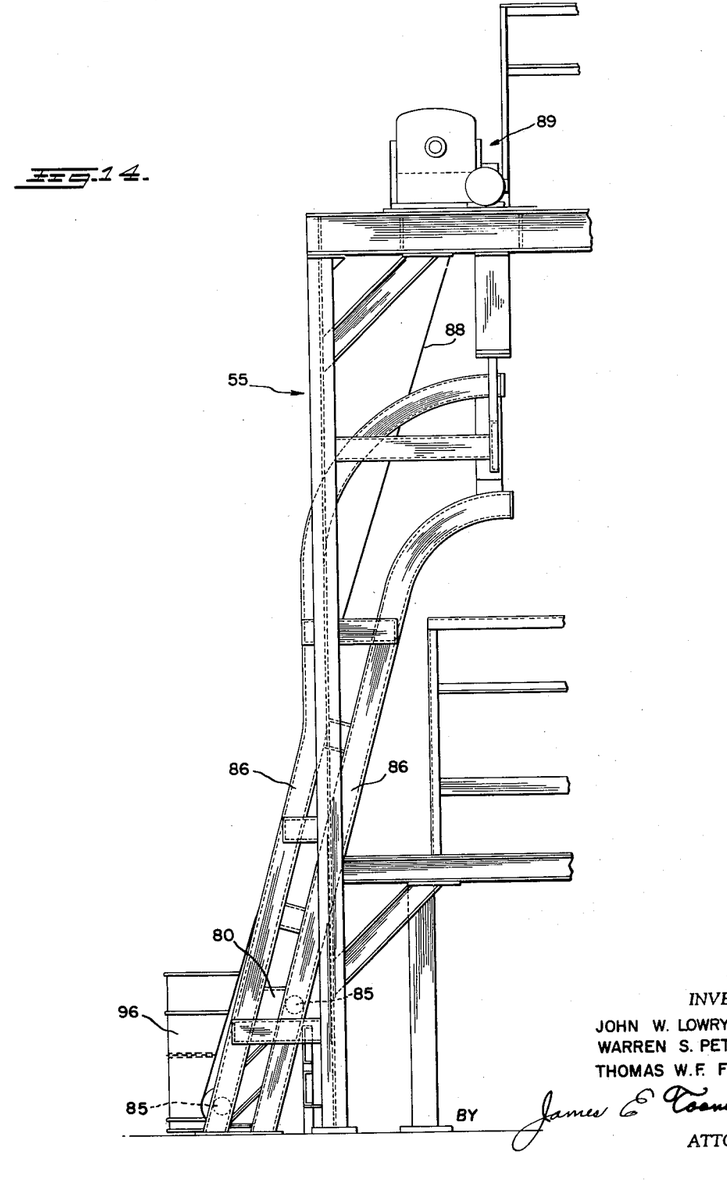
FIGURE 14 is a side elevational view of a skip hoist employed for charging the rotary barrel furnace of FIGURE 11.
Figure 19:
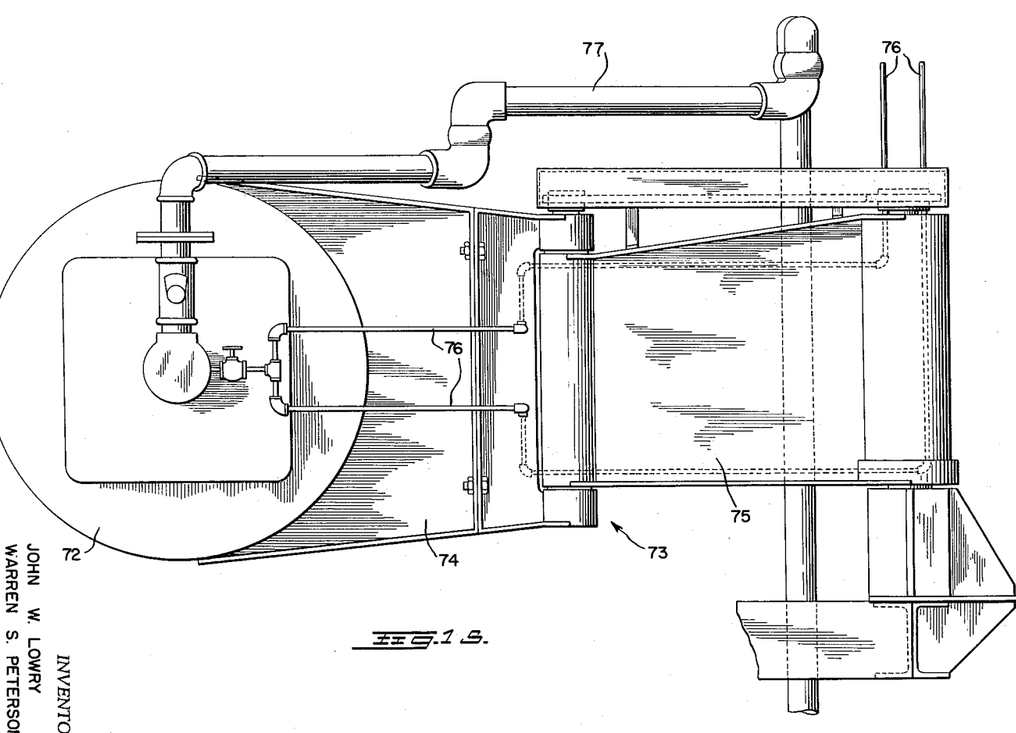

With reference to FIGURES 11, 12 and particularly, FIGURE 14, skip hoist 80 is provided with rollers 85 on each end which ride in two pairs of tracks 86 suitably mounted on framework 55. In order to charge rotary barrel 51, the charging material is loaded into a suitable container 96 which in turn is fastened to the skip hoist when it is resting on the floor. The loaded skip hoist is then raised by means of a cable 88 and a motor driven winch 89 to its upper position at which position it dumps the material into hopper 79 which is in the loading position. The material dumped into hopper 79 then passes into barrel 51 through the large circular opening in end 71.

An alternative means for charging the salt flux to the rotary barrel 51 may involve the use of a bucket conveyor. Such a device generally comprises a series of buckets mounted on an endless chain. With such a device the material is loaded into the buckets at the lower end and is dumped by the buckets as they pass around a sprocket at the upper end. Such a device could be adapted to raise salt flux from floor level and dump it into hopper 79 when hopper 79 is in position.

Where such a bucket conveyor mechanism is employed the quantity of material being charged should be measured by a conventional counter device. Since the buckets all hold the same quantity the total amount of material being charged can be measured by a device for counting the number of buckets passing the dumping point.

When it is desired to dump the processed dross and salt from the barrel 51 after the molten metal has been tapped or drained out, a lifting floor plate 90 is raised by means of a hydraulic cylinder and piston assembly 91, a crank 92 and shaft 93 on which floor plate 90 is pivotally mounted. The barrel 51 is then raised to the vertical position in the manner previously described wherein the material is dumped out through the large circular opening in end 71, and through the opening in the platform floor provided by raising floor plate 90. A suitable portable container may be placed in position on the floor below plate 90 for the purpose of receiving the material being dumped. After dumping, the barrel 51 may be returned to the horizontal position wherein it is ready for charging followed by heating with burner 72.

It will be understood that various changes, omissions and additions may be made to this invention without departing from the spirit and scope thereof as set forth in the appended claims. For example, while only one tapping hole was illustrated in the drawings and description, it may be desirable to employ more than one tapping hole, preferably at either end of the rotary barrel furnace. It may be particularly desirable to have such tapping holes diagonally opposite each other whereby refractory wear is decreased and thus the life of the furnace lining may be increased.

What is claimed is:

1. A method of reclaiming metallic values from aluminous dross containing a substantial amount of large lumps comprising the steps of intimately tumbling said aluminous dross with a salt flux in solid form consisting of a mixture of sodium chloride, potassium chloride and a small but effective amount of a fluoride constituent adapted to strip oxide coating from aluminum metal values contained in said aluminous dross, in a maner characterized by violent cascading of said aluminous dross and salt flux mixture to break up said lumps of said aluminous dross, said flux being characterized by a melting point not greater than 1380 degrees F., melting said salt flux by applying sufficient heat to said aluminous dross and salt flux mixture, maintaining said mixture at a temperature ranging from 1350° F. to 1500° F., and then stripping the oxides from said dross by the action of said molten flux to release molten aluminous values while tumbling said mixture in a manner characterized by a gentle rolling action, said values agglomerating in a molten metal pool and said molten flux being present in an amount to also provide a protective covering for said molten aluminous values thereby substantially preventing losses of aluminum metal due to oxidation and burning.

2. The method of claim 1 wherein the temperature of said aluminous dross and salt flux mixture is maintained between 1400 degrees F. and 1450 degrees F.

3. A method of reclaiming metallic values from aluminous dross containing a substantial amount of large lumps, comprising the steps of intimately tumbling said aluminous dross with a salt flux in solid form consisting essentially of a mixture of from 15 to 75% by weight of sodium chloride, 25 to 85% by weight of potassium chloride, and a small but effective amount of a fluoride constituent adapted to strip oxide coating from aluminum metal values contained in said aluminous dross, in a manner characterized by violent cascading of said aluminous dross and salt flux mixture to break up said lumps of said aluminous dross, melting said salt flux by applying sufficient heat to said aluminous dross and salt flux mixture to obtain a temperature ranging from 1350 degrees F. to 1500 degrees F., maintaining said mixture within said temperature range by the continued application of heat, and then stripping the oxides from said dross by the action of said molten flux to release molten aluminous values while tumbling said mixture in a manner characterized by a gentle rolling action, said values agglomerating in a molten metal pool and said molten flux being present in an amount to also provide a protective covering for said molten aluminous values thereby substantially preventing losses of aluminum metal due to oxidation and burning.

4. The method of claim 3 wherein the temperature of said aluminous dross and salt flux mixture is maintained between 1400 degrees F. and 1450 degrees F.

5. The method of claim 3 wherein the ratio of salt flux to non-metallic materials in the aluminous dross ranges from 1:1 to 3:1 by weight.

6. The method of claim 5 wherein said salt flux consists essentially of a mixture of from 15 to 65% by weight sodium chloride, 35 to 85% by weight potassium chloride and a small but effective amount of cryolite and wherein the temperature of said aluminous dross and salt flux mixture is maintained between 1400 degrees F. and 1450 degrees F.

7. A method of reclaiming metallic values from aluminous dross containing a substantial amount of large lumps comprising the steps of placing hot aluminous dross inside a rotating cylindrical surface while said surface is rotating at a slow rate, increasing said rate of rotation to a high rate and placing a salt flux in granular form inside said cylindrical surface, said salt flux consisting of a mixture of from 15 to 75% by weight sodium chloride, 25 to 85% by weight potassium chloride and a small but effective amount of a fluoride constituent adapted to strip oxide coating from aluminum metal values contained in said aluminous dross, said high rate of rotation resulting in intimate tumbling characterised initially by violent cascading of said aluminous dross and salt flux mixture to break up said lumps of said aluminous dross, melting said salt flux by applying sufficient heat to said aluminous dross and salt flux mixture to obtain a temperature ranging from 1350 degrees F. to 1500 degrees F., maintaining said mixture within said temperature range by the continued application of heat, and stripping the oxides from said dross by the action of said molten flux to release molten aluminous values while tumbling said mixture by continuing said high rate of rotation which is characterized, when said salt flux is molten, by a gentle, rolling action, said values agglomerating in a molten metal pool and said molten flux being present in an amount to also provide a protective covering for said molten aluminous values thereby substantially preventing losses of aluminum due to oxidation and burning, draining the molten aluminum metal obtained by said processing and dumping the remaining aluminous dross and salt flux mixture from the inside of said surface.

8. The method of claim 7 wherein the ratio of salt flux to nonmetallic materials in the aluminous dross ranges from 1:1 to 3:1 by weight.

9. The method of claim 7 wherein the ratio of weight of dross to the weight of salt flux ranges from 1:1 to 3:1.

10. The method of claim 8 wherein said salt flux consists of a mixture of from 15 to 65% by weight sodium chloride, 35 to 85% by weight potassium chloride and a small but effective amount of cryolite and wherein the temperature of said aluminous dross and salt flux mixture is maintained between 1400 degrees F. and 1450 degrees F.

11. The method of claim 10 wherein the aluminous dross and salt flux mixture is tumbled and heated for from 5 to 15 minutes.

12. The method of claim 11 wherein said salt flux consists of 45% sodium chloride, 50% potassium chloride and 5% cryolite.

References Cited in the file of this patent

UNITED STATES PATENTS

| | | |
|---|---|---|
| 1,615,009 | Frost | Jan. 18, 1927 |
| 1,950,967 | Bonsack | Mar. 13, 1934 |
| 2,481,591 | Heilman et al. | Sept. 13, 1949 |
| 2,754,199 | Stroup et al. | July 10, 1956 |
| 2,809,028 | Kinney et al. | Oct. 8, 1957 |
| 2,820,705 | Warner | Jan. 21, 1958 |
| 2,848,321 | Bunbury et al. | Aug. 19, 1958 |

UNITED STATES PATENT OFFICE

CERTIFICATE OF CORRECTION

Patent No. 3,043,678                          July 10, 1962

John W. Lowry et al.

It is hereby certified that error appears in the above numbered patent requiring correction and that the said Letters Patent should read as corrected below.

Column 5, line 24, for "form" read -- from --; line 69, for "change" read -- charge --; column 6, line 15, for "side view" read -- side elevational view --; line 58, for "posiiton" read -- position --; column 7, line 1, for "while" read -- While --; column 10, line 18, for "maner" read -- manner --.

Signed and sealed this 1st day of January 1963.

(SEAL)
Attest:

ERNEST W. SWIDER
Attesting Officer

DAVID L. LADD
Commissioner of Patents